United States Patent [19]

Sackin et al.

[11] 4,321,681

[45] Mar. 23, 1982

[54] PROTECTIVE RELAY APPARATUS

[75] Inventors: Milton Sackin, Mt. Lebanon Township, Warren County; David M. Edison; Francis T. Thompson, both of Murrysville, all of Pa.

[73] Assignee: Westinghouse Electric Corp., Pittsburgh, Pa.

[21] Appl. No.: 77,801

[22] Filed: Sep. 21, 1979

[51] Int. Cl.³ .................. H02H 7/26; G06F 15/56
[52] U.S. Cl. .................. 364/492; 361/68; 361/79; 324/52
[58] Field of Search .................. 364/480–483, 364/492–493; 361/79, 68, 80; 324/52

[56] References Cited

U.S. PATENT DOCUMENTS

| | | | |
|---|---|---|---|
| 3,569,785 | 3/1971 | Durbeck et al. | 317/27 |
| 3,593,124 | 7/1971 | Cahen et al. | 324/52 |
| 3,723,864 | 3/1973 | Ricard | 324/52 |
| 3,731,152 | 5/1973 | Rockefeller | 317/27 R |
| 3,735,204 | 5/1973 | Maenicke | 317/27 R |
| 3,758,763 | 9/1973 | Nohara et al. | 324/103 R X |
| 3,885,199 | 5/1975 | Nohara et al. | 317/27 R |
| 3,931,502 | 1/1976 | Kohlas | 324/52 X |
| 3,983,377 | 9/1976 | Vitins | 324/52 X |
| 3,984,737 | 10/1976 | Okamura et al. | 317/36 D |
| 4,107,778 | 8/1978 | Nii et al. | 364/492 |
| 4,128,805 | 12/1978 | Lanz | 324/52 |
| 4,148,087 | 4/1979 | Phadke | 361/80 |
| 4,183,072 | 1/1980 | Takagi et al. | 364/480 X |
| 4,187,525 | 2/1980 | Nagura et al. | 361/79 X |
| 4,228,476 | 10/1980 | Okita et al. | 361/68 |

OTHER PUBLICATIONS

High Speed Protection of Power Systems Based on Improved Power System Models; Slemon, Robertson & Ramamoorty; CIGRE 31-09, 1968, pp. 1–15.
Real Time Calculation of Resistance and Reactance for Transmission Line Protection by Digital Computer; McInnes & Morrison; Paper No. 2938, submitted 6-2-5-70, The Institution of Engineers, Australia.
Fault Protection with a Digital Computer, IEEE Transactions on Power Apparatus and Systems, vol. PAS-88, No. 4, pp. 438–464, Apr. 1969, by Rockefeller.

*Primary Examiner*—Edward J. Wise
*Attorney, Agent, or Firm*—D. R. Lackey

[57] ABSTRACT

Protective relay apparatus for electric power systems which logically relates the outputs of two algorithms to provide the fastest possible trip for the conditions of the post-fault voltage and current waveforms.

8 Claims, 8 Drawing Figures

PROTECTIVE RELAY APPARATUS

BACKGROUND OF THE INVENTION

1. Field of the Invention

The invention relates in general to protective relay apparatus for electrical power systems, and more specifically to impedance distance relays for the protection of electrical power transmission lines.

2. Description of the Prior Art

Protective relaying apparatus for ac electrical power systems must discriminate between faults and normal system transients, and it must make a trip/no-trip decision quickly in order to maintain system stability, minimize fault current damage, and maintain system security. One class of protective relaying apparatus for transmission line protection is the impedance distance relay. The impedance distance relay measures the impedance of the transmission line from the location of the relay to the fault location, and if the fault lies within the protection zone of an associated circuit breaker, the circuit breaker is immediately tripped. If the fault is outside the protection zone, the circuit breaker is not immediately tripped. It may, however, be tripped after a suitable time delay, selected to allow the tripping of other breakers, in order to provide coordinated back-up protection for adjacent breakers.

In an electromechanical distance relay, the hardware completely defines the operating characteristics, with the induction cylinder providing the multiplying/integrating functions which generate the required protection zone on the R/X plane.

It would seem that the digital computer could be programmed to provide the functions of an ideal distance relay, because of its operating speed, the ability to provide almost any desired protection zone geometry, and the fact that it may perform many complex calculations per cycle of the system power frequency. Mathematical formulas, which require as few as three samples to predict the peak of a current sinusoid make the use of a digital computer even more attractive, as the sampling of the voltage and current waveforms need not be synchronized to the phase position of the alternating parameter being measured. For example, a sample of data, and its derivative, may be used; or, as disclosed in U.S. Pat. No. 3,731,152, which is assigned to the same assignee as the present application, the peak magnitude of a sinusoidal quantity may be determined by using the first and second derivatives of the quantity. As hereinbefore stated, three consecutive samples are required to make the calculation, and thus the algorithm has an aperture or data window of three samples. In other words, a time length of twice the sample spacing. In order to correctly predict fault current magnitude, the three consecutive samples must follow the fault inception point, as pre-fault values in the data window would naturally give an incorrect prediction of peak magnitude.

Thus, it would appear that a digital computer could be easily programmed to detect a fault, make three impedance calculations of three digitized successive samples following fault inception, and correctly make a trip/no-trip decision. This will be true if the fault waveforms are pure sinusoids. In practice, however, the fault waveforms are usually distorted. For example, the current waveform may have a dc offset transient, the magnitude of which may be as large as the fault current peak. The magnitude depends upon a variety of factors, such as the fault inception angle and pre-fault load current. Line reactance prevents an instantaneous change in current from load to fault value, creating this decaying exponential dc transient as the system changes from a pre-fault steady state condition, to a post-fault steady state condition. The voltage and current waveforms are not immune to other distortion either, as they may contain harmonics, transients, and other high frequency noise, such as caused by non-linear elements, surge reflections, current transformer saturation, and the like.

Thus, it will easily be seen that an algorithm which makes its decision after three data samples can make an incorrect prediction of peak magnitude, if the waveforms are distorted.

The hereinbefore mentioned algorithm of U.S. Pat. No. 3,731,152, which uses first and second differentials or differences instead of the sample and the first differential or difference, reduces the sensitivity of the algorithm to frequencies below power frequency, including the dc offset, but it is extremely sensitive to higher frequencies because of the additional differentiation. Thus, some sort of post-algorithm averaging or integration must be used to stabilize the output signals and provide data from which intelligent trip/no-trip decisions may be made.

The samples may of course be digitally filtered by a suitable filtering program, prior to applying the samples to the algorithm step, but many more samples must be taken before a post-fault steady state calculation may be reached, extending the data window and thus the time following fault inception before an accurate trip/no-trip decision may be made. Also, digital filtering programs may require more computation time than possible with a microprocessor, especially with a high sampling rate. It would be desirable to provide a program implementable with a microprocessor, because of the attractive economic factors associated with microprocessors. The results of the algorithm may also be processed, such as by numerical integration, to preclude noise induced trips, but again extending the data window.

Instead of attempting to expand a three sample data window algorithm by some sort of pre- and/or post-algorithm processing, other algorithms have been developed which inherently perform substantial filtering of the data. For example, Fourier and Walsh type algorithms have been developed in which the data is filtered in the algorithm itself. These algorithms provide band pass characteristics central about power frequency, and provide a steady state, accurate impedance calculation one full cycle of samples following fault inception, and thus these algorithms have a data window equal to one full power frequency cycle. Thus, the present practice is to pick an algorithm, deemed to be the best compromise between security and speed, for the specific transmission line to be protected.

SUMMARY OF THE INVENTION

Briefly, the present invention is a new and improved distance relay which requires no compromise between speed and security. Two complementary algorithms are selected, with one of the algorithms being a fast algorithm, such as one having a three sample data window, but which suffers inaccuracies when the waveforms are distorted. The other algorithm is a slower algorithm, such as a full cycle Fourier algorithm, but which produces accurate results notwithstanding severe waveform distortion. The two algorithms are processed in a logically related manner to optimally yield post-fault impedance values which indicate the fault is within the protection zone of the associated circuit breaker, initiating the trip signal for the circuit breaker.

Thus, when a fault is within the protection zone of the circuit breaker, the circuit breaker will trip on the faster algorithm, if unambiguous information is developed. The circuit breaker will also trip on the faster algorithm, delayed by post-algorithm processing, such as numerical integration, if such processing produces unambiguous information. The breaker will trip on the slower algorithm, if unambiguous information is not produced by the faster algorithm.

The two algorithms may be simultaneously processed by two computers, such as two microprocessors, using separate, or shared memories. They may be simultaneously processed by a single computer by stepping back and forth between the algorithms relative to each data sample. Or, the faster algorithm may be processed alone until it is evident that it is producing ambiguous data, with the slower algorithm then being processed alone, or along with the faster.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF PREFERRED EMBODIMENTS

Figure 1:
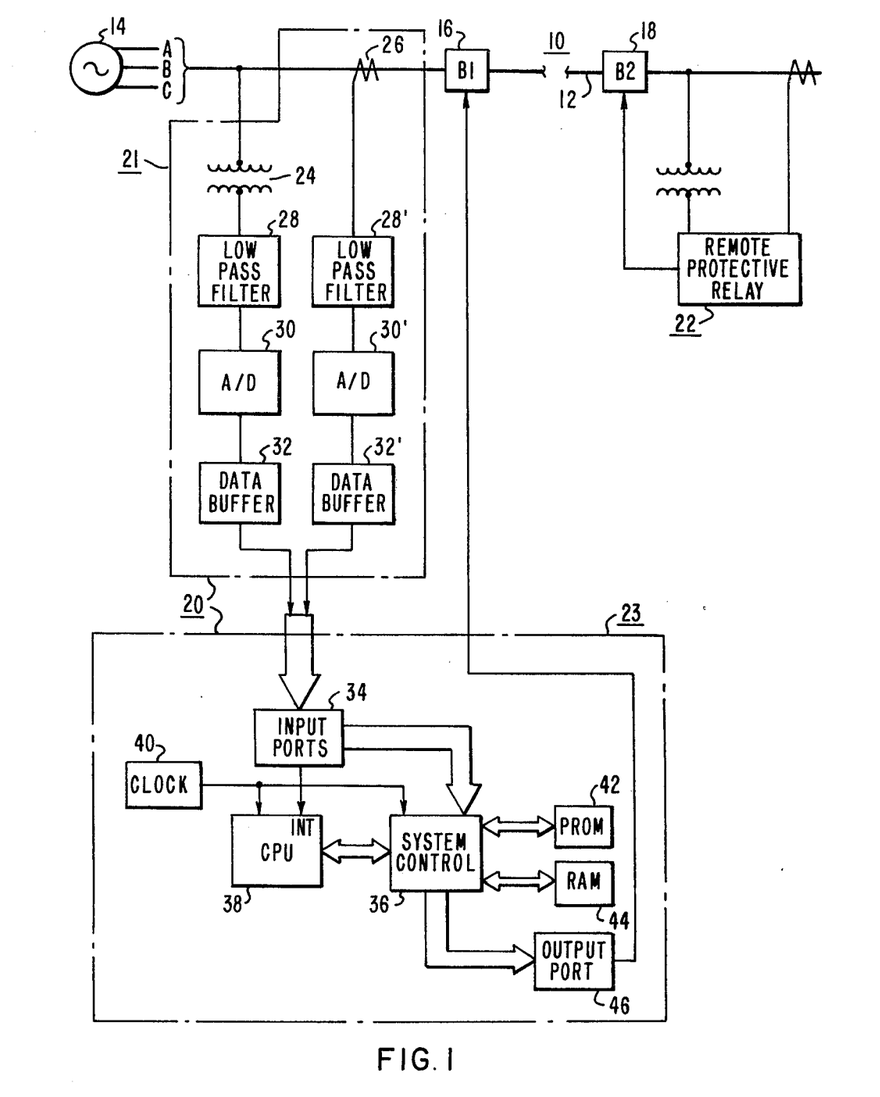
FIG. 1 is a block diagram of an ac impedance relay associated with a transmission line in an electrical power system to be protected, which relay may be constructed according to the teachings of the present invention.

Referring now to the drawings, and to FIG. 1 in particular, there is shown a three-phase, 60 Hz electric power system 10 having a transmission line 12 to be protected. The three-phase ac voltage source, shown generally at 14, having lines A, B and C, is connected to one end of transmission line 12 via a circuit breaker 16, and the other end of the transmission line 12 is typically connected to another three-phase source (not shown), via a circuit breaker 18. A protective relay 20 is associated with circuit breaker 16, and a protective relay 22 is associated with remote circuit breaker 18. Since the protective relays 20 and 22 are similar, only protective relay 20 is shown in detail.

Protective relay 20 is of the class of relays known as distance relays, and more specifically to the class in which the relay measures the distance from the relay to a fault by calculating the impedance Z of the line from the point of the relay to the fault location. If the calculated impedance to a fault is greater than a predetermined value, the fault lies outside the protection zone of the associated circuit breaker 16, and it will not be immediately tripped. If the calculated impedance is less than this predetermined value, the fault lies within the protection zone of the associated circuit breaker 16, and it will be immediately tripped by an appropriate signal from protective relay apparatus 20.

Protective relay 20 includes a data acquisition function 21 and a data processing function 23. The data acquisition function 21 develops digitized samples of the voltage and current appearing on the transmission line 12 at a predetermined sampling rate. In other words, each line voltage is sampled, and each line current is sampled. A rate of twelve to sixteen digitized samples of the voltage and current per cycle of the power frequency is typical, with twelve being selected for purposes of example. Thus, a sample is received approximately every 1.38 ms, assuming a power frequency of 60 Hz. However, it is to be understood that a slower, or faster, sampling rate may be used, if desired.

The digitized voltage and current samples provided by function 21 may be obtained by conventional data acquisition techniques, such as with potential and current transformers 24 and 26, respectively, the outputs of which are filtered in low pass analog filters 28 and 28' to prevent aliasing. The filtered signals are converted to digital form in analog-to-digital converters 30 and 30' and held in data buffers 32 and 32'; or, a single analog to digital converter with an appropriately sized single data buffer may be used.

The data processing function 23 of protective relay 20 may include the usual minicomputer or microprocessor architecture and hardware structures, with a sixteen bit microprocessor, such as Motorola's M68000, having sufficient operating speed and memory capacity to perform the calculation required for the protective relay function. Included in the data processing function 23 are input ports 34 for receiving the digitized data, system control 36, a central processing unit (CPU) 38, a system clock 40, read-only memory (PROM) 42 for storing the operating program, random access memory (RAM) 44 for storing data, and an output 46 for directing a trip signal to circuit breaker 16.

In general, the present invention relates to a new and improved impedance distance relay, which utilizes two different mathematical algorithms. Algorithms which may be used are known in the art, and, per se, form no part of the invention. The invention lies in the selection and use of two algorithms having specified characteristics, and a logical interrelationship between them. Suitable fault detection routines are also known in the art. Fault detecting routines which may be used are disclosed in an IEEE article entitled "Fault Protection With A Digital Computer" by G. D. Rockefeller, IEEE Transactions On Power Apparatus And Systems, Vol. PAS-88, No. 4, pages 438–464, April 1969. This article discloses that a fault detection may be made by detecting voltage aberrations. This article further discloses routines for locating the faulted line or lines, distance calculations, and angle comparison to detect direction of power flow. Finally, this article, as well as the hereinbefore mentioned U.S. Pat. No. 3,731,152, discloses a fast, three-data window algorithm which may be used for the faster of the two algorithms in the present invention, which algorithm inherently filters frequencies below the power frequency. This algorithm utilizes first and second differentials of the samples, instead of the more conventional sample and its first difference.

Another algorithm which may be used in the present invention for the faster of the two algorithms is disclosed in an article entitled "Real Time Calculation of Resistance And Reactance For Transmission Line Protection By Digital Computer," by A. D. McInnes and I. F. Morrison, Paper No. 2938, submitted June 25, 1970, The Institution of Engineers, Australia. This algorithm models the transmission line to be protected as a series R-L circuit, and solves the basic differential equation of the transmission line for the resistance and reactance of the faulted section.

An algorithm suitable for the slower of the two algorithms used in the present invention is disclosed in an article entitled "High Speed Protection Of Power Systems Based On Improved Power System Models," by G. R. Slemon, S. D. T. Robertson, and M. Ramamoorty, CIGRE 31-09, 1968.

This algorithm is a full-cycle Fourier analysis, with the Fourier analysis providing an output that responds accurately and unambiguously, notwithstanding highly distorted fault waveforms.

FIGS. 2 through 5 are graphs which illustrate the different responses of the three sample aperture or data window algorithm, and the full-cycle Fourier algorithm, to faults with, and without, badly distorted fault waveforms. The sampling rate for the graphs is twelve samples per cycle of power frequency, with the reactance X component, and the resistive component R, of the impedance Z being shown for each sample with an asterisk and a circle, respectively.

Figure 2:
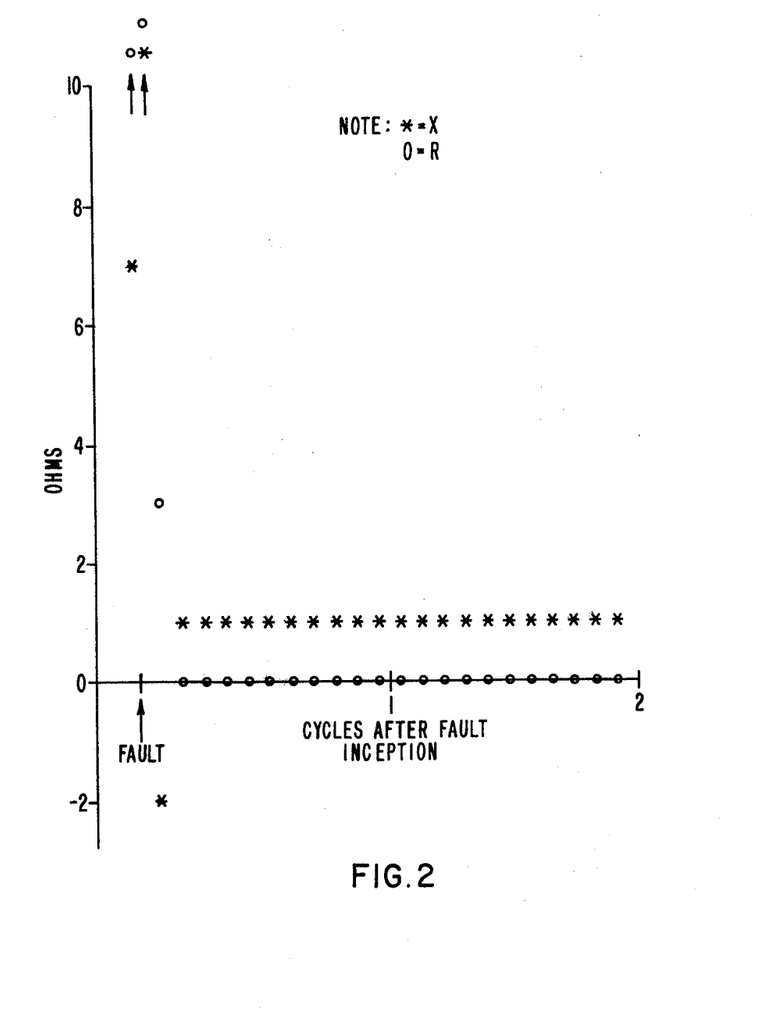
FIG. 2 is a graph which plots calculated resistance R and reactance X of the apparent impedance of a transmission line, from the relay to the fault location, with negligible extraneous frequencies in the voltage and current waveforms, using a fast algorithm having a three sample data window.
Figure 3:
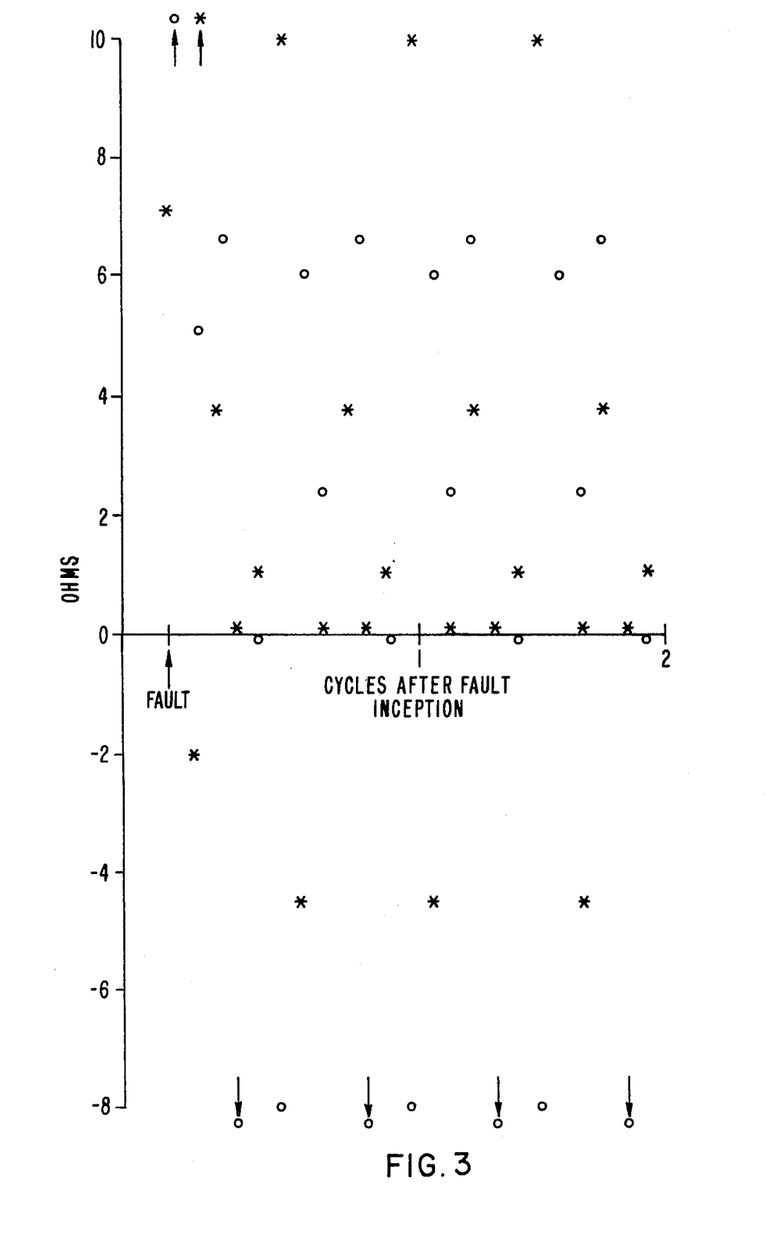
FIG. 3 is a graph which illustrates the response of the same algorithm shown in FIG. 2, to the same type of fault, except wherein the fault waveforms are severely distorted with large amplitudes of third and fifth harmonics.

FIG. 2 plots the resistance R and reactance X components of apparent line impedance Z to the fault, for a fault having relatively little distortion in the voltage and current waveforms, using the first and second differences algorithm of the hereinbefore mentioned IEEE article and U.S. patent. It will be noted that the R and X components stabilize as soon as the data window includes three post-fault samples. Thus, a very fast, reliable trip/no-trip decision may be made. FIG. 3, however, illustrates the response of the same algorithm to a fault containing large third and fifth harmonic amplitudes. The data developed is ambiguous, and an intelligent trip/no-trip decision will be made impossible from the algorithm itself. Post-algorithm processing may provide stable results, depending upon the severity and type of waveform distortion.

Figure 4:
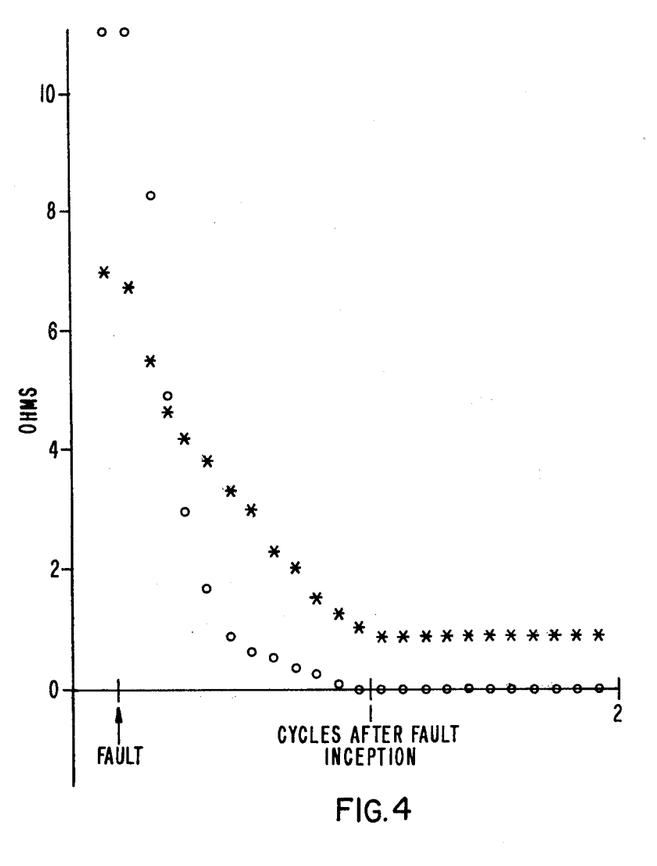
FIG. 4 is a graph which plots calculated resistance R and reactance X of the apparent impedance of a transmission line, from the relay to fault location, with negligible extraneous frequencies using a slower algorithm having a twelve sample (full-cycle) data window.
Figure 5:
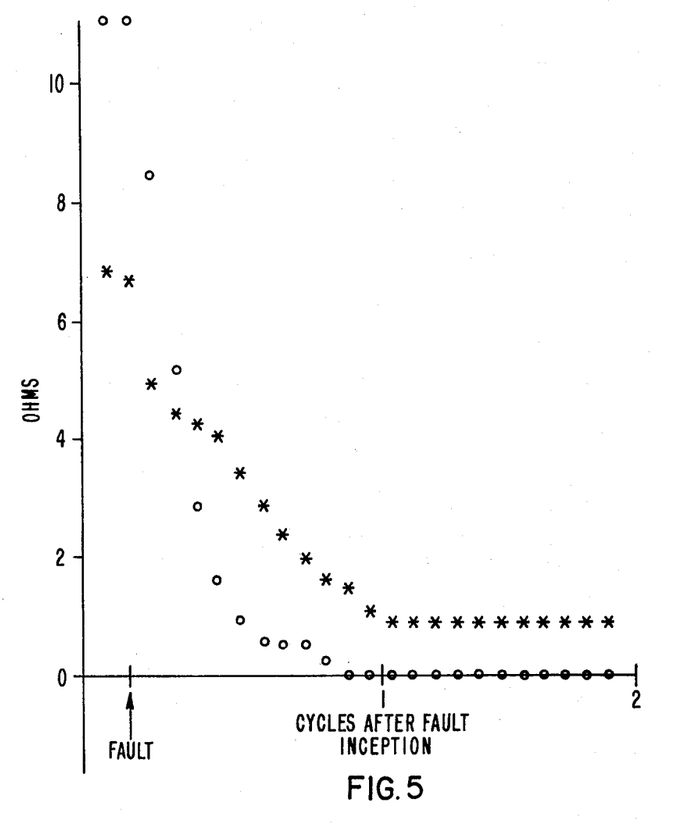
FIG. 5 is a graph which illustrates the response of the same algorithm used in the graph of FIG. 4, to the same type of fault, except with large amplitudes of the third and fifth harmonics in the fault waveforms.

FIGS. 4 and 5 illustrate the response of the full-cycle Fourier type algorithm, such as disclosed in the hereinbefore mentioned Slemon et al paper, to fault waveforms which are relatively distortion free, and to badly distorted fault waveforms, respectively. It will be noted that the results smoothly converge towards a steady state position in one power frequency cycle, in both instances, thus providing information for basing a reliable trip/no-trip decision.

Figure 6:
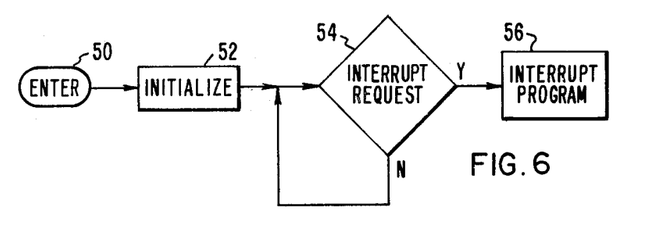
FIG. 6 is a flow chart illustrative of a main program which may be used.

The availability of each new data sample may be brought to the attention of the computer by interrupts, for example. Thus, a main program is interrupted by the availability of each new sample, to initiate a fault detecting function in the interrupt routine. If a fault is detected, additional routines are called to categorize and locate the fault. The main program may be performing other tasks not directly related to impedance distance relaying. Since these other tasks are not important to the invention, the main program, set forth in FIG. 6, is simply shown looping as it awaits an interrupt. For example, the main program starts at 50 and when power is first turned on, it initializes the various counters and registers at 52. The computer then "watches" the interrupt pin at 54, and upon detecting an interrupt it branches to the interrupt program 56.

Figure 7:
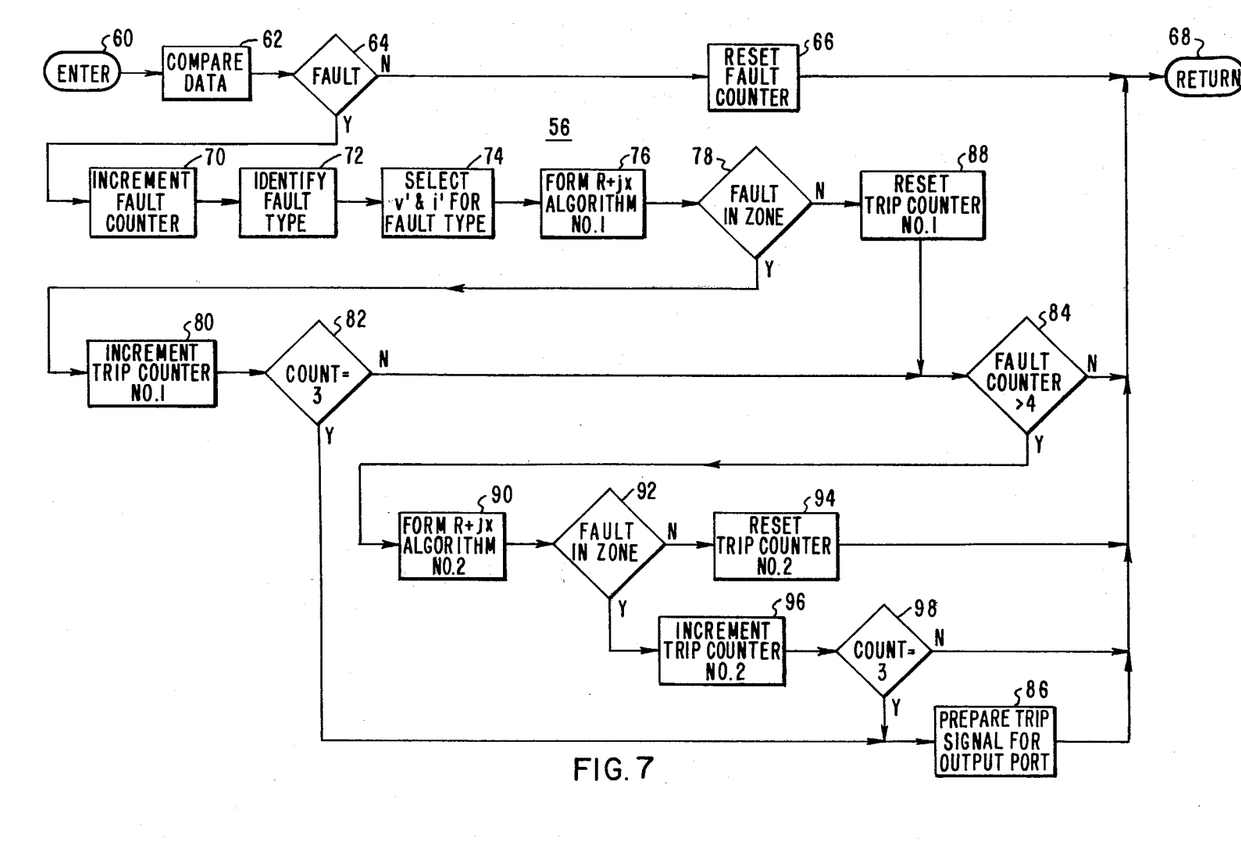
FIG. 7 is a flow chart of an interrupt program formulated according to a first embodiment of the invention.

An interrupt program 56, formulated according to a first embodiment of the invention, is shown in FIG. 7. In this embodiment, the faster algorithm is processed alone after fault detection, until it is determined that the faster algorithm is producing ambiguous results. The two algorithms are then processed in unison.

More specifically, the interrupt program is entered at 60 and step 62 compares the digital data, voltage, current, or both, with the previous sample, or samples, to note an out-of-tolerance difference or aberration which indicates the possibility of a fault. Step 64 determines if a detected difference is sufficient to possibly indicate a fault condition. If a fault condition is not detected on this sample, step 66 resets a fault counter, which may be a software counter, and the program returns to the main program at 68. If step 64 notes a possible fault, step 70 increments the fault counter, step 72 identifies the fault type, i.e. single line to ground, double line to ground, line-to-line, or three-phase fault, and the affected lines, and step 74 prepares a representative fault voltage v' and fault current i', for the specific fault and affected lines. For example, if lines A and B are shorted to one another, v' would be $v_A-v_B$, and i' would be $i_A-i_B$.

Step 76 utilizes the selected fault voltage v' and fault current i' to calculate the impedance of the transmission line from the location of the relay 20 to the fault. For example, the impedance Z may be determined in the form $Z = R + jX$, where R is the resistance of the line to the fault, and X is the reactance. The circuit breaker 16 has a certain protection zone, i.e. a certain transmission line distance, and the circuit breaker 16 should be tripped if the fault lies within this protection zone. Step 78 compares the distance-to-fault with the protection distance of the breaker, and determines if the fault is within the protection zone. If the fault is determined to be within the protection zone, step 80 increments a trip counter, referred to as trip counter No. 1. The trip counter, which may be a software counter, is used to make sure that the determination of an in-zone fault was not accidental, by counting the successive number of samples which indicate that the fault lies within the protection zone. For example, if the algorithm indicates the fault is within the protection zone of the circuit breaker 16 on three successive data samples, it may be assumed that the results are not ambiguous. Thus, step 82 checks to see if trip counter No. 1 has reached a count of three. If it has not reached a count of three, step 84 checks to see if the slower algorithm should be started, or if it has already been started, by checking the count on the fault counter. If it exceeds some number higher than three, for example, it indicates that while a fault has been detected on four or more successive samples, and the faster algorithm is either producing ambiguous information, or it is indicating that the fault is outside of the protection zone of the circuit breaker 16. In either event, once it is determined that the faster algorithm has not provided a trip signal within three samples following fault incidence, it is now desirable to start the slower algorithm to provide unambiguous information, in the event the first algorithm is providing ambiguous information, or to confirm that the fault indeed lies outside of a protection zone. The faster of the two algorithms may still provide unambiguous information calling for a trip, before the slower algorithm finishes its complete cycle of data, especially if the faster algorithm includes a post-algorithm processing routine, as hereinbefore mentioned. If the fault counter does not exceed the number of consecutive fault determinations selected as the number to start the slower algorithm, the interrupt program returns to the main program 68. Returning to step 82, if trip counter No. 1 has a count equal to three, step 86 prepares a trip signal for the output port 46, which in turn directs the trip signal to the trip circuitry of circuit breaker 16.

Returning now to step 78, if the first algorithm finds that the fault is not within the protection zone of circuit breaker 16, step 88 resets trip counter No. 1 and advances to step 84, hereinbefore described.

If step 84, arrived at from either step 88 or step 82, finds that the fault counter exceeds the selected count, such as four, step 90 starts the second algorithm using the v' and i' developed in step 74 to form the line impedance $Z = R + jX$. Step 92 determines if the fault is within the protection zone of the circuit breaker, and if it is not, step 94 resets a trip counter associated with the second algorithm, referred to as trip counter No. 2, and it returns to the main program at 68.

If step 92 finds that the fault lies within the protection zone of circuit breaker 16, step 96 increments trip counter No. 2, step 98 checks the count, and if it has not reached the required number of successive trip decisions, the interrupt program returns to the main program 68. If trip counter No. 2 has reached this number, i.e. three in the example, step 86 prepares the trip signal which initiates breaker tripping, and the interrupt program returns to the main program at 68.

Figure 8:
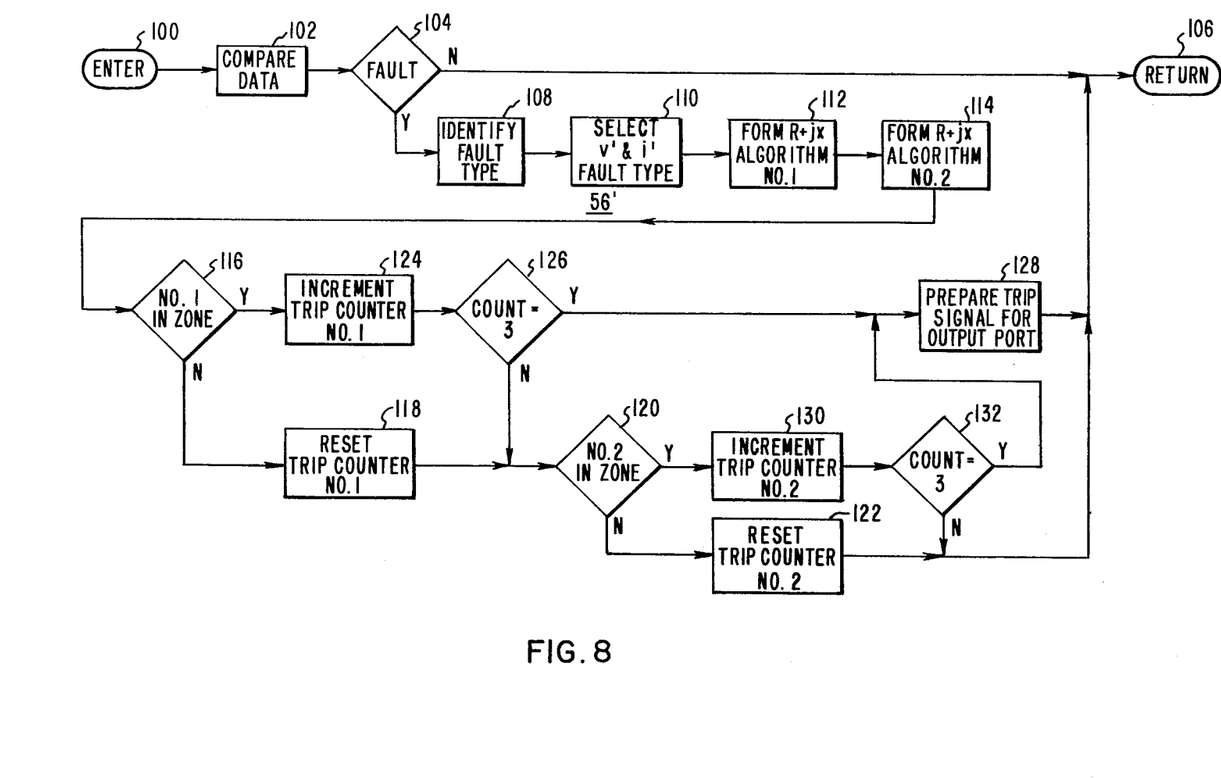
FIG. 8 is a flow chart of an interrupt program formulated according to another embodiment of the invention.

The embodiment set forth in FIG. 7 only requires that the computer calculate the line impedance with the slower algorithm when the faster algorithm does not provide a trip signal within four data samples following a fault, but it does have the disadvantage of delaying the maximum trip time by four samples if the trip signal is produced by the slower algorithm. If this is not desirable, both algorithms may be processed simultaneously, starting with the very first post-fault sample, using the same computer, or with two different computers, as desired. If two different computers are used, they may share a common memory, if desired. FIG. 8 illustrates an embodiment of the invention wherein both the faster and slower algorithms are processed with a single computer, by sequentially calculating the line impedance using the two algorithms, for each new data sample. More specifically, the interrupt program shown in FIG. 8, referenced 56' in order to distinguish it from the interrupt program 56 shown in FIG. 7, is entered at 100 and step 102 compares the latest data samples to detect the possibility of a fault. If a fault is not detected, as determined in step 104, the program returns to the main program at 106. If a fault possibility exists, step 104 advances to step 108, with step 108 initiating a routine which identifies the fault type, and step 110 selects v' and i' for the specific fault type. Step 112 forms the impedance of the line $Z = R + jX$, using the faster algorithm, and step 114 forms the impedance $Z = R + jX$, using the slower algorithm. Step 116 checks to see if the faster algorithm provided a result which indicates a fault within the protection zone, and if an in-zone detection is not made, step 118 resets trip counter No. 1 associated with the faster algorithm. Step 118 then advances to step 120 which checks to see if the slower algorithm provided an in-zone detection. If it did not, step 122 resets trip counter No. 2 associated with the slower algorithm, and the interrupt program returns to the main program at 106.

If step 116 found an in-zone result, step 116 would advance to step 124 which increments trip counter No. 1, and step 126 checks the count. If the count has not reached to preset count, such as three, the program returns to step 120. If the preset count has been reached, the program advances to step 128 which prepares a trip signal for the output port, resulting in the tripping of the circuit breaker 16.

If step 120 has found an in-zone detection, the program would advance to step 130 which increments trip counter No. 2, and step 132 checks the count of this counter. If the count has not reached the preset count, the program would return to the main program 106, and if the count has reached the preset count, the program would advance to step 128 for preparing the trip signal for the output port.

In summary, there has been disclosed a new and improved impedance distance relay suitable for computer relaying, which does not require selection of an algorithm based on a compromise between speed and reliability. The invention utilizes a very fast algorithm, which may be subject to providing ambiguous results when the fault waveforms are distorted, and a relatively slow but secure algorithm which provides stable results notwithstanding severly distorted fault waveforms. The two algorithms are logically interrelated such that a trip signal for an associated circuit breaker will be provided as soon as one of the algorithms provides consistent unambiguous data which indicates a fault within the protection zone of the circuit breaker.

We claim as our invention:

1. Protective relay apparatus for providing a trip signal for a circuit breaker in an ac electrical power transmission system when a fault is in the protection zone of the circuit breaker, comprising:

first means providing digital information responsive to predetermined parameters of the electrical power transmission system, including voltage and current, at a predetermined sampling rate, second means responsive to said digitial information for repetitively determining apparent distance to a fault using a first predetermined process having a predetermined data window, said second means additionally including comparison means for comparing each determined distance with a predetermined protection zone, with said comparison means providing an in-zone signal when the distance determination is within the protection zone, third means responsive to said digital information for repetitively determining apparent distance to a fault using a second predetermined process having a longer data window than the first predetermined process, said third means additionally including comparison means for comparing each determined distance with a predetermined protection zone, with said comparison means providing an in-zone signal when the distance determination is within the protection zone, and fourth means responsive to said second and third means for providing a trip signal for the circuit breaker in response to an in-zone signal from either of the second or third means.

2. The protective relay apparatus of claim 1 including means for detecting fault occurrence in response to at least certain of the digital information, with the second means initiating its distance-to-the-fault determination in response to fault detection by said fault detection means.

3. The protective relay apparatus of claim 2 wherein the third means initiates its distance-to-the-fault determination in response to fault detection by the fault detection means.

4. The protective relay apparatus of claim 1 wherein the third means initiates its distance-to-the-fault determination in response to the failure of the third means to provide consistent unambiguous results.

5. The protective relay apparatus of claim 1 wherein the data window of the second predetermined process is approximately one cycle of the power frequency, and the data window of the first predetermined process is less than about one-third of one cycle of the power frequency.

6. The protective relay apparatus of claim 1 wherein the predetermined sampling rate of the first means is about twelve to sixteen samples per cycle of the power frequency, the second and third means repititively determine distance at the predetermined sampling rate, and the data windows of the first and second predetermined processes are about three and twelve to sixteen distance determinations, respectively.

7. The protective relay apparatus of claim 1 including at least one digital computer, with the second, third, and fourth means being in the form of instructions which program the digital computer to provide the specified functions.

8. The protective relay apparatus of claim 1 wherein the fourth means logically relates the distance determinations of the second and third means, providing a trip signal after a predetermined number of successive in-zone determinations by either of the second or third means.

* * * * *